US008583604B2

(12) United States Patent
Bird et al.

(10) Patent No.: US 8,583,604 B2
(45) Date of Patent: Nov. 12, 2013

(54) EFFICIENT INTEGRATION BETWEEN AN EXTERNAL WORKLOAD MANAGER AND AN RDBMS

(75) Inventors: Paul Miller Bird, Markham (CA); Donna N Eng Dillenberger, Yorktown Heights, NY (US); Mark Francis Hulber, New York, NY (US); David Cree Manners, Poughkeepsie, NY (US); Francis Wong, Thornhill (CA); Peter B. Yocom, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 12/388,721

(22) Filed: Feb. 19, 2009

(65) Prior Publication Data

US 2010/0211555 A1 Aug. 19, 2010

(51) Int. Cl.
*G06F 17/30* (2006.01)
(52) U.S. Cl.
USPC ............... 707/687; 707/689; 709/203; 705/4
(58) Field of Classification Search
USPC ............ 707/615, 655, 620, 609, 689; 705/4
See application file for complete search history.

(56) References Cited

U.S. PATENT DOCUMENTS 7,159,005 B1 * 1/2007 Baber et al. .................. 709/200
7,349,865 B2 3/2008 Fergusson et al.
2004/0215709 A1 * 10/2004 Basani et al. ................ 709/201
2006/0020760 A1 * 1/2006 Kandil et al. ................ 711/154
2007/0100793 A1 5/2007 Brown et al.

OTHER PUBLICATIONS

"Orchestration Case Study: Integrating WebShere and DB2 Orchestration with Enterprise Workload Manager", IMB Corporation 2004.
Rogers et al., "z/OS Version 1 Release 8 Implementation", ibm.com/redbooks, Feb. 2007.
"Technology Showcase", IBM Centers for Advanced Studies: CASCON archives, 2004.

* cited by examiner

*Primary Examiner* — Hung T Vy
*Assistant Examiner* — Tuan-Khanh Phan
(74) *Attorney, Agent, or Firm* — Cantor Colburn LLP; Joseph Polemeni

(57) ABSTRACT

According to one embodiment of the present invention, a system, method and computer program product is provided for integrating an external workload manager with a database system. The method according to one embodiment includes a method comprises: receiving a request in a database component, the request including a cross component token; starting a new unit of work in workload management software in the database component, in response to the request; determining, from a cross component workload management unit, a transaction class and a synchronization code using the database component; finding an internal workload in the workload management software that matches the transaction class and the synchronization code of the cross component workload management unit; and using the matching internal workload for the new unit of work.

23 Claims, 8 Drawing Sheets

EFFICIENT INTEGRATION BETWEEN AN EXTERNAL WORKLOAD MANAGER AND AN RDBMS

BACKGROUND

The present invention relates to workload management (WLM), and more specifically, to the integration of the WLM logic of a component in an information technology (IT) environment with cross-component WLM software.

Customer IT environments consist of multiple components including hardware platforms, with associated operating systems, and multiple software products. The objective of the customer in such an environment is to manage this heterogeneous mixture in an efficient and cohesive way in order to achieve their business objectives, which are usually expressed to the IT environment in terms of throughput and performance objectives. To aid the customer in this exercise, a number of the components in the standard IT environment have introduced a form of workload management (WLM) to help reflect business priorities and objectives onto the lower-level requests that they process.

In addition to the WLM logic in such standard IT components, new cross-component products, such as IBM's EWLM, have been introduced to help coordinate WLM efforts over the environment as a whole. One challenge posed by such products is to efficiently enable the individual components to tightly integrate their own internal WLM efforts with cross-component WLM software so that the overall effect is harmonious and the impact on the customer in terms of effort and maintenance is minimized. The cross-component WLM software has awareness of much more of the business than the individual component, while the individual component is the only one aware of how external requests map into its own internal processing mechanisms. The latter situation is particularly true in the case of relational database systems (RDBMS) where business requests almost always break down into one or more internal requests.

SUMMARY

According to one embodiment of the present invention, a method comprises: receiving a request in a database component, the request including a cross component token; starting a new unit of work in workload management software in the database component, in response to the request; determining, from a cross component workload management unit, a transaction class and a synchronization code using the database component; finding an internal workload in the workload management software that matches the transaction class and the synchronization code of the cross component workload management unit; and using the matching internal workload for the new unit of work.

According to another embodiment of the present invention, a method comprises: receiving a request in a relational database management system, the relational database management system having internal workload management software, wherein the request includes an external workload management system token; starting a new unit of work in the internal workload management software in the relational database management system; the relational database management system contacting an external workload management system to determine an external workload management system transaction class and synchronization code; the relational database management system finding an internal workload in the internal workload management software that matches the transaction class and the synchronization code of the external workload management system; and the relational database management system using the matching internal workload for the new unit of work.

According to a further embodiment of the present invention, a system comprises: a relational database management system; internal workload management software within the relational database management system; an external workload management system; the internal workload management software receiving an incoming request which has been classified by the external workload management system and analyzing the request to determine the classification of the request.

According to another embodiment of the present invention, a computer program product for integrating an external workload manager and a database system comprises: a computer usable medium having computer usable program code embodied therewith, the computer usable program code comprising: computer usable program code configured to: receive a request in a database component, the request including a cross component token; start a new unit of work in workload management software in the database component; determine, from a cross component workload management unit, a transaction class and a synchronization code using the database component; find an internal workload in the workload management software that matches the transaction class and the synchronization code of the cross component workload management unit; and use the matching internal workload for the new unit of work.

DETAILED DESCRIPTION

Figure 1A:
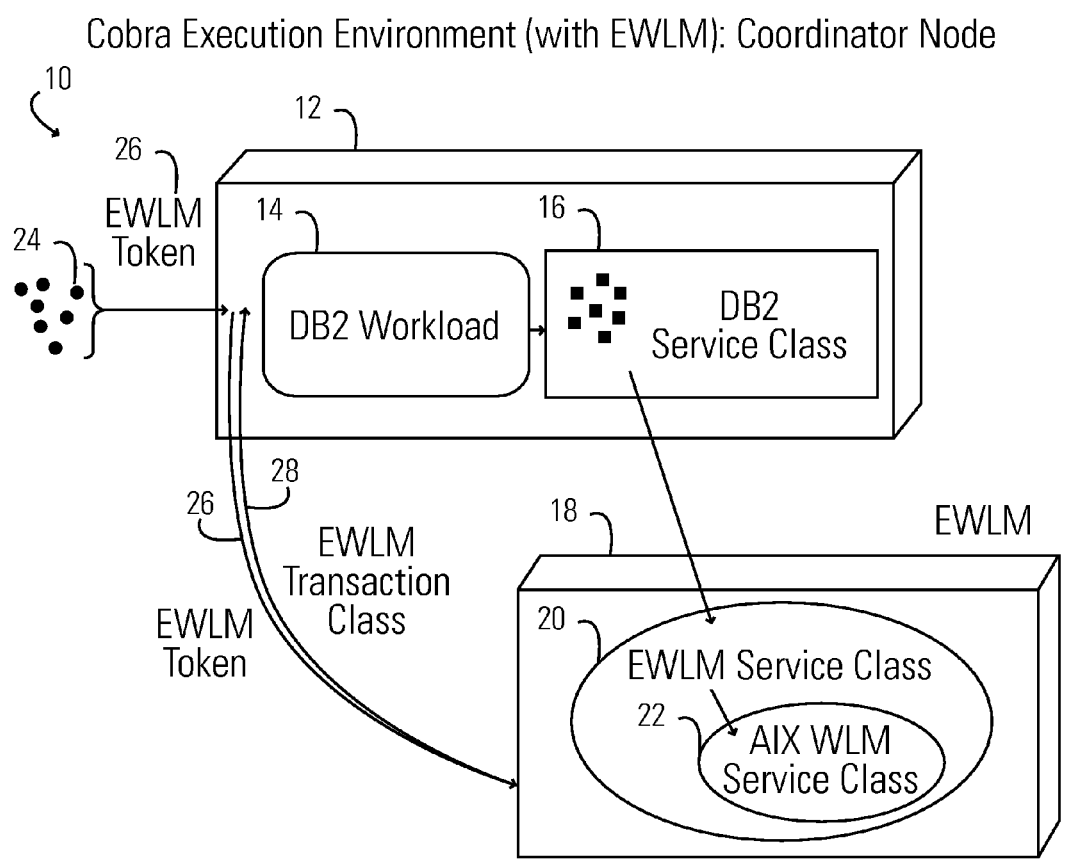
FIGS. 1A and 1B show a diagrams of a relational database system which with an integrated external workload manager, in accordance with an embodiment of the invention.

Embodiments of the invention provide a system, method and computer program product for integrating a cross-component workload manger (WLM) with a component, such as a relational database management system (RDBMS). In particular, embodiments of the invention employ an efficient method for integrating both the WLM knowledge and handling performed by a cross-component WLM software product and a component WLM software product. In an exemplary embodiment, the cross-component WLM product is EWLM, and the component which also contains WLM logic is DB2 for Linux, UNIX, and Windows (DB2 for LUW). In embodiments of the invention, a component such as an RDBMS (e.g. DB2 for LUW) can discover what type of external requests it is receiving and can interact with an identified cross-component product like EWLM to acquire the definitions needed to synchronize its internal processing with the external WLM controls. In accordance with some aspects of the invention, this can be done in an RDBMS for both partitioned and non-partitioned databases.

Embodiments of the invention employ an algorithm by which component WLM logic can:
- discover when requests representing new external WLM classifications are encountered
- automatically acquire information on new external WLM classifications in order to create corresponding internal WLM classifications
- properly map incoming requests to the correct internal WLM classifications to respect the external WLM mappings
- share management of the request with the external WLM product during its processing life within the component In terms of DB2 for LUW, embodiments of the invention the WLM logic within DB2 for LUW can automatically discover, acquire, and align DB2 WLM definitions with those being used by EWLM. Also, DB2 WLM and EWLM can cooperatively manage request processing within DB2 for LUW. In various embodiments of the invention this can be done for both partitioned and non-partitioned databases.

There are a number of benefits of the invention including:
- eliminates the need for customer to define WLM classifications in two places: the cross-component WLM product and the component's WLM (e.g. EWLM and WLM within DB2 for LUW)
- eliminates the need to manually synchronize changes in these classifications between the cross-component and component
- provides consistent end-to-end definitions, monitoring, and resource control within the customer's IT environment
- enhances the awareness and control of cross-component WLM products such as EWLM when interacting with component WLM logic In contrast, prior systems usually addressed the challenge of efficiently enabling individual components to tightly integrate their own internal WLM efforts with cross-component WLM software. in one of the following ways:
1. The issue is ignored and there is no integration between the cross-component and component WLM logic.
2. The cross-component WLM software translates and exports the entire breadth of its awareness into the terms and awareness of the individual component WLM logic so that the component WLM logic can take appropriate action. In this case, the responsibility for handling the request is delegated completely to the component WLM logic.
3. Separate instances of the individual component are created where each occurrence deals only with external requests associated with one specific class of business activity, which has only one associated objective/priority. The component WLM logic is effectively bypassed by only passing the component a homogeneous (in terms of business priority and objectives) set of requests.

None of the three approaches offer a satisfactory solution. The first approach requires that the customer explain the business priorities and objectives to each WLM product and there is no sharing of information or cooperative handling of requests.

The second approach greatly increases the amount of information that the individual component must store and analyze when processing requests with much of this information perhaps being irrelevant to the component since it does not receive requests related to that information. This negatively affects the storage requirements and processing overhead of the component WLM logic. Also, this approach requires that the component WLM logic has the inherent capabilities needed to understand and enforce the stated objectives.

The last approach requires duplicate and inefficient use of system resources in order to create separate processing environments. It also increases the complexity and thus, the manageability, of the customer's environment. Furthermore when an RDBMS is acting as the component, an additional complexity arises in the area of a shared-nothing RDBMS where external requests come in from multiple database partitions and need to be treated properly and consistently regardless of where they arrive.

With the present invention, there is a partnership and efficient interaction between the cross-component and component WLM logic to minimize the interactions and effort required of the customer. Also, with the present invention, each part is allowed to do what it is good at, and system resources are used efficiently.

In the following discussion, the specific examples of EWLM and DB2 for LUW are used for illustration purposes. However, those skilled in the art will appreciate that the teachings of the present invention may be applied to other components besides DB2 for LUW including other types of RDBMS, and that the teachings of the present invention may be applied to other cross-component WLM products besides EWLM.

Figure 1B:
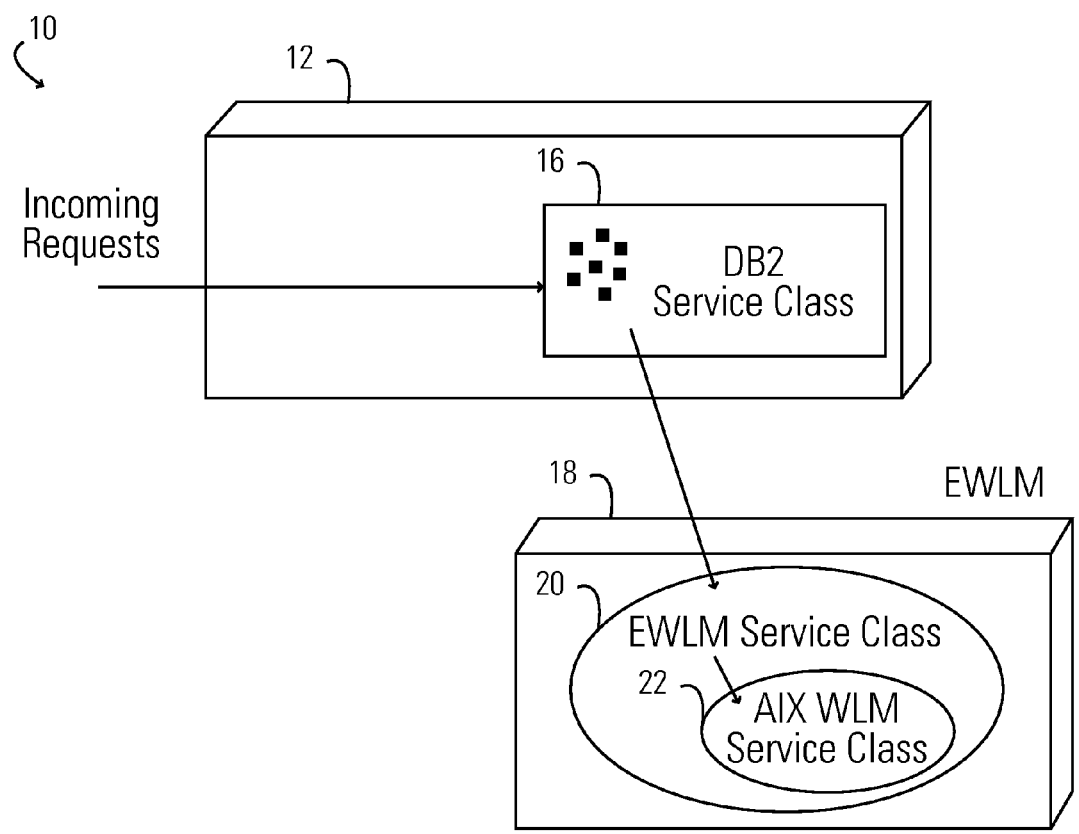

Referring now to FIG. 1A there is shown a database system 10 in accordance with an embodiment of the invention. The database system 10 includes a component 12, which in this example comprises a RDBMS such as DB2 for LUW. This component 12 includes a workload unit 14, which is located within the component 12 workload management logic. Component 12 also includes a DB2 service class unit 16. A cross component WLM product, such as EWLM 108 is also shown in FIG. 1. The EWLM 18 includes an EWLM service class unit 20, which includes an Advanced Interactive eXecutive (AIX) WLM service class unit 22. It will be appreciated that AIX is IBM's version of UNIX operating system. The internal workload management logic within AIX is AIX WLM. AIX WLM also has the concept of service classes. The database system 10 shown in FIG. 1A operates in a Cobra execution environment, where Cobra is the code name for DB2 V9.7.

External business requests 24 are received by the component 12. Each external business request 24 contains an associated EWLM identification token 26. This EWLM identification token 26 represents how the request was identified and classified within EWLM 18. The EWLM 18 assigns work to a specific EWLM transaction class 28 within a specific EWLM service class in the EWLM service class unit 20. A business request usually breaks down into at least one distinct database unit of work (UOW) with one or more database requests being made to DB2 for LUW within that UOW.

Figure 2:
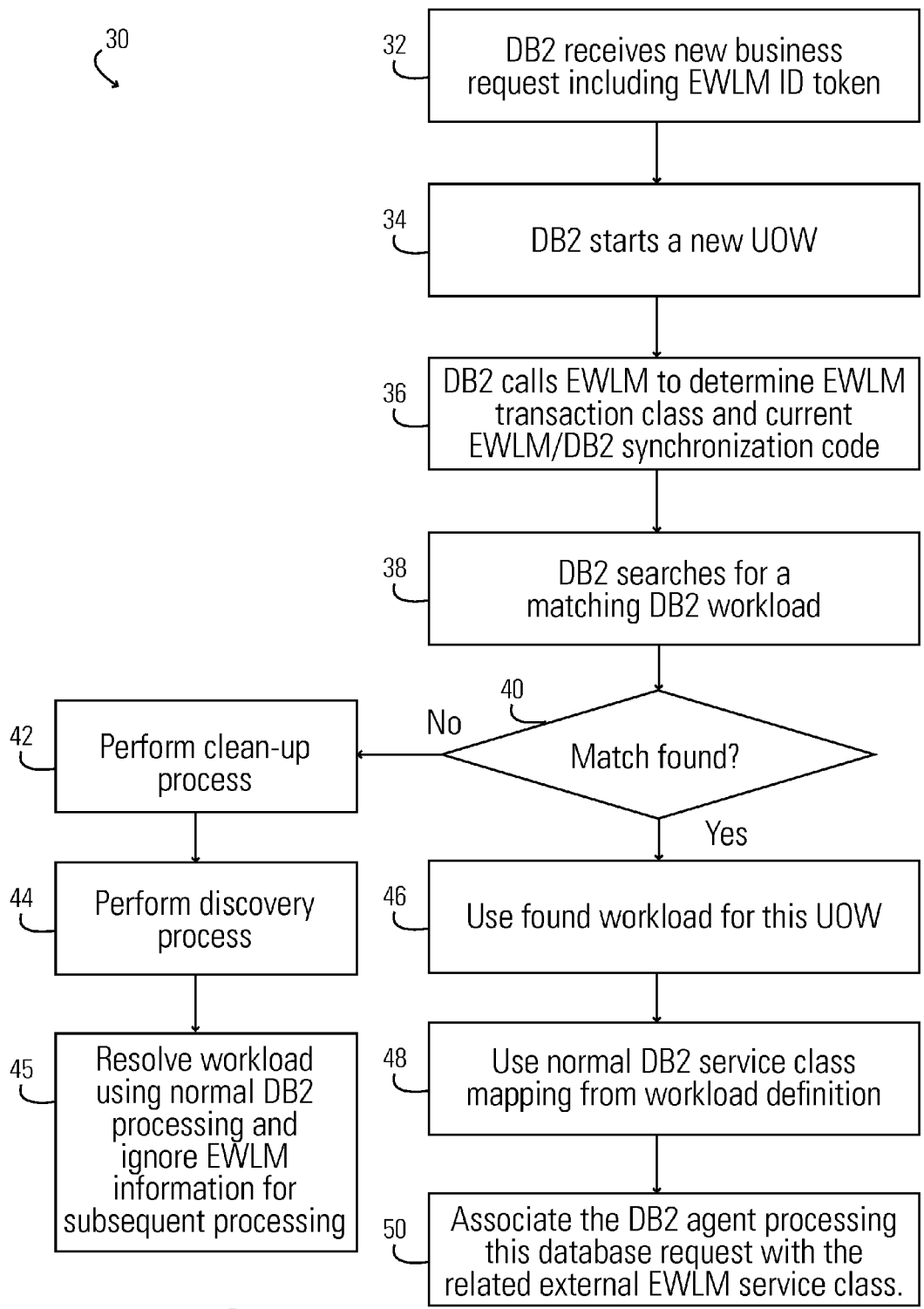
FIG. 2 shows a flow chart of a method for integrating an external workload manager with a relational database system, in accordance with an embodiment of the invention.

There are two prerequisite changes that should be made to implements embodiments of the invention. These are:
1. Prerequisite changes to EWLM:
   Every change to a classification within EWLM generates a new "synchronization code" value which is stored with the affected EWLM classification information
2. Prerequisite Changes to DB2:
   Change DB2 workload definitions to allow storage of EWLM/DB2 synchronization code and EWLM transaction class as search key
   Change DB2 service class definitions to allow storage of EWLM token to be used for automatic agent association Referring now to FIG. 1B, there is shown a database system, which is similar to the database system, shown in FIG. 1A, except that it is a remote node. It will be appreciated that DB2 is a distributed database system that can have multiple logical nodes spread across multiple machines. Requests can arrive at any of the logical nodes. The node that an external request arrives at is called the coordinator node, such as the node illustrated n FIG. 1A. The request may require information to be retrieved from the other logical nodes in the database. The other logical nodes in the database are referred to as remote nodes. Once a request is placed in a DB2 service class, the sub-requests sent to remote nodes are placed in the same service class at the remote nodes. FIG. 2 shows a flow chart of a method 30 for integrating an external workload manager with a relational database system, in accordance with an embodiment of the invention. In step 32, DB2 receives a new business request. DB2 may be, for example the component 12, the new business request may be the business request 24, both shown in FIG. 1. The new business request will includes a new EWLM ID token, such as the EWLM token 26 shown in FIG. 1. In step 34, DB2 starts a new unit of work (UOW). DB2 will then call EWLM_API1 to determine the EWLM transaction class and current EWLM/DB2 synchronization code, in step 36. EWLM_API1 (as well as EWLM_API 2 and API3, described below) are APIs, which are functions within EWLM for retrieving workload management information from EWLM. EWLM_API1 returns a request's EWLM transaction class and the transaction class' synchronization code given a request's EWLM token. EWLM_API2 is used to inform EWLM which DB2 agent (i.e. which thread in the operating system) is working for a particular request. In this way, EWLM has a complete picture of which threads are working on a particular external request. EWLM may also associate all the threads working for a particular external request with an operating system level workload management system (e.g. AIX WLM) to control the resource priority of the threads. EWLM_API3 returns information on an EWLM transaction class and its associated EWLM service class given an EWLM transaction class ID and synchronization code. If the EWLM transaction class is not found, or if the EWLM transaction class is found but the synchronization code is out of date, then nothing is returned.

Figure 3:
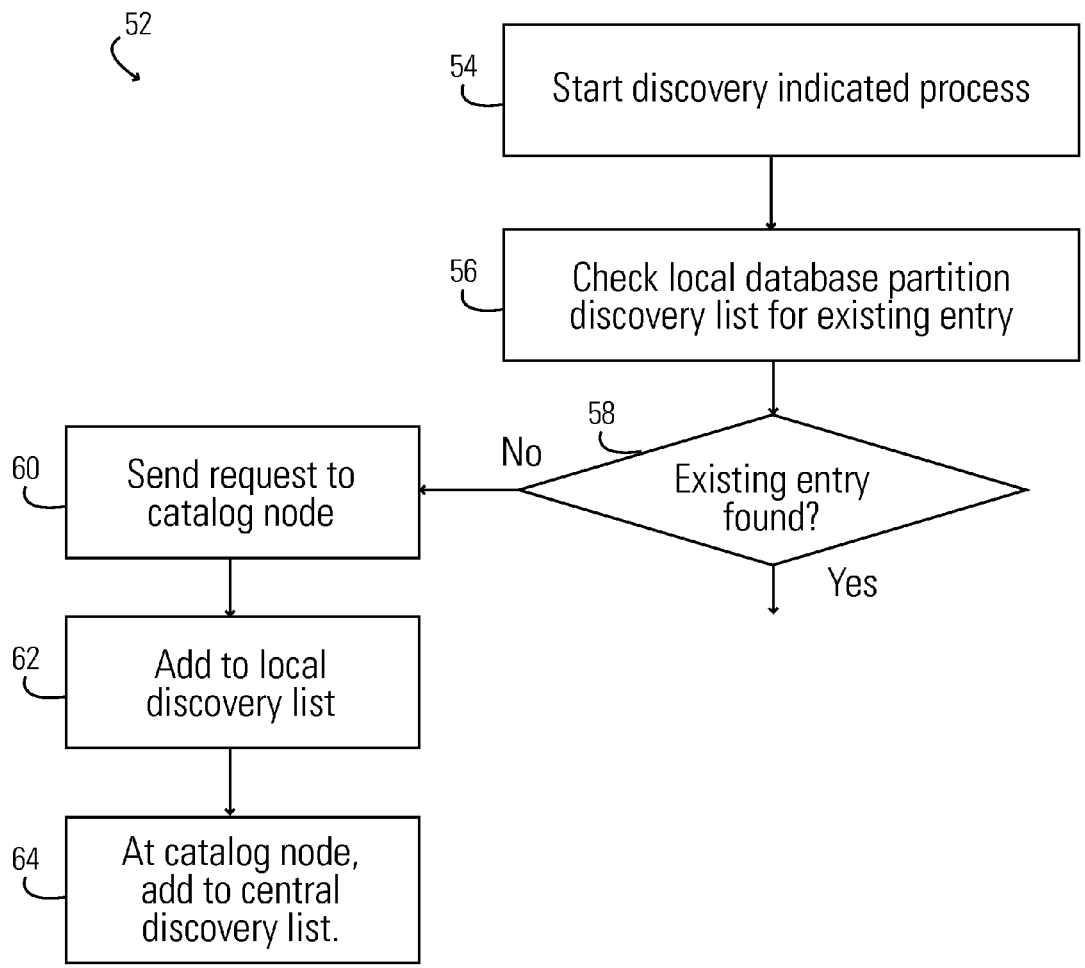
FIG. 3 shows a flow chart of a discovery process used with the method for integrating an external workload manager with a relational database system shown in FIG. 2, in accordance with an embodiment of the invention.

Next, in steps 38 and 40, DB2 will search for a matching DB2 workload with the same synchronization code and same EWLM transaction class. If a different synchronization code is encountered, there is no match and DB2 will detect that a cleanup is required for this workload. The cleanup is performed in step 42, which is described in more detail in FIG. 4. Since no match is found, step 44 indicates that discovery is required, which is performed in step 44. Additional details of step 44 are shown in FIG. 3. Next the process resolves the workload using normal DB2 processing and ignores EWLM information for this subsequent processing, in step 45.

If step 40 determines that there is a match, that workload is used for this UOW, in step 46. In step 48, the process uses the normal DB2 service class mapping from the workload definition. In step 50, if there is an EWLM service class associated with DB2 service class definition, the process 30 will automatically call the EWLM_API2 to associate the DB2 agent processing this database request with the related external EWLM service class. It is noted that a DB2 workload that is associated with an EWLM transaction class should have an associated DB2 service class with an EWLM service class association. If a request is mapped to a DB2 service class with no associated EWLM service class mapping, DB2 won't call EWLM_API2 to associate the agent working on that request with EWLM.

FIG. 3 shows a flow chart of a discovery process 52 used with the method for integrating an external workload manager with a relational database system shown in FIG. 2, in accordance with an embodiment of the invention. In step 54 the discovery process is initiated. In step 56, the process checks the local database partition discovery list for an existing entry. If an existing entry is not found, in step 58, then the process sends a request to a catalog node in step 60. The process then adds an entry to a local discovery list, in step 62. In step 64, at the catalog node, the process adds an entry to a central discovery list. The catalog node is the node within DB2 that stores all catalog information. There can only be one catalog node within DB2. Hence, the catalog node is often used as a central synchronization point for the database system. For the discovery scheme in this embodiment, instead of having every node interact with EWLM separately to discover new and updated EWLM transaction classes, all discovery requests are sent to the catalog node. Only the catalog node interacts with EWLM to discover new and updated EWLM transaction classes. Once information on new and updated EWLM transaction classes are retrieved at the catalog node, this information is disseminated to all nodes. If, in step 58, if an entry is found then nothing needs to be done. A request to discover new or updated EWLM transaction class has already been sent to the catalog node. Once the new or updated EWLM transaction class is retrieved by the catalog node and disseminated to all nodes, the discovery list entry is removed on all nodes.

Figure 4:
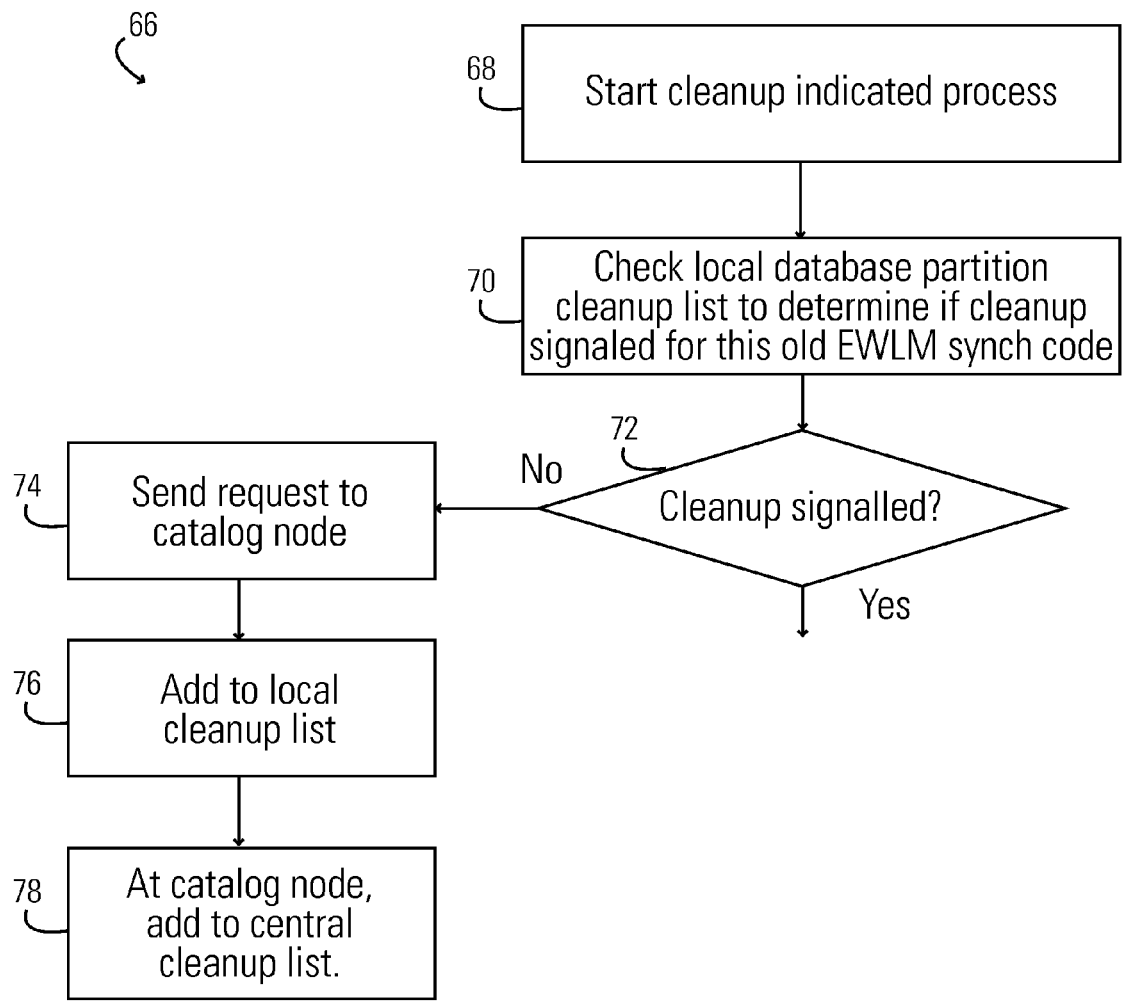
FIG. 4 shows a flow chart of a cleanup process used with the method for integrating an external workload manager with a relational database system shown in FIG. 2, in accordance with an embodiment of the invention.

FIG. 4 shows a flow chart of a cleanup process 66 used with the method for integrating an external workload manager with a relational database system shown in FIG. 2, in accordance with an embodiment of the invention. In step 68, the process initiates the cleanup process. In step 70 the process checks the local database partition cleanup list to see if cleanup is signaled for this old EWLM synchronization code. If step 72 determines that cleanup is not signaled, step 74 will send a request to the catalog node and an entry is added to the local cleanup list, in step 76. This entry is used to indicate that the workload associated with EWLM transaction class is stale and needs to be cleaned up. Once the catalog node removes this stale workload from catalog, the workload is also removed from memory on all nodes. This entry will be removed from the clean up list on all nodes at that time. Then in step 78, at the catalog node, the process adds to the central cleanup list if not already there.

In one embodiment of the invention, an autonomous daemon performs a number of checks on a regular basis. In particular, the autonomous daemon checks the central discovery and clean up lists on a regular basis to sync up DB2's workload management configuration with EWLM's configuration. When a request is associated with an EWLM transaction class and EWLM service class, it is desirable for DB2 to have the associated DB2 workload and DB2 service class available for the request to execute in. In order to keep up with changes to the EWLM configuration, DB2 uses an autonomous daemon to check for new or updated EWLM transactions classes and associated EWLM service classes. Once information on a new or updated EWLM transaction class is retrieved from EWLM, an associated DB2 workload is created. An associated DB2 service class is also created if it does not already exist. The autonomous daemon checks the clean up list to remove stale DB2 workloads for which the associated EWLM transaction class no longer exists or has been modified. Stale DB2 service classes that are associated EWLM service classes may also be removed.

Figure 5:
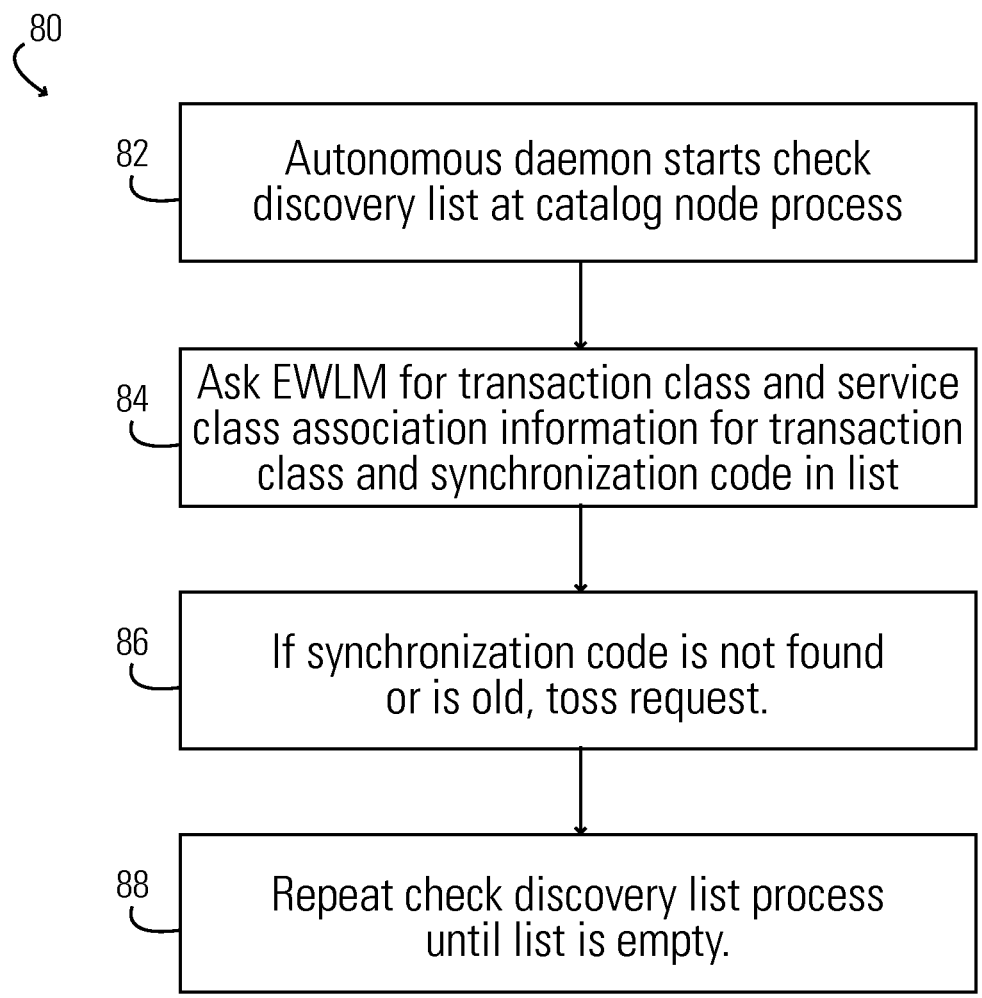
FIG. 5 shows a flow chart of a check discovery list process used with the method for integrating an external workload manager with a relational database system shown in FIG. 2, in accordance with an embodiment of the invention.

FIG. 5 shows a flow chart of a check discovery list process 80, used with the method for integrating an external workload manager with a relational database system shown in FIG. 2, in accordance with an embodiment of the invention. In step 82, an autonomous daemon starts the check discovery list at catalog process. In step 84, the process asks EWLM_API3 for EWLM transaction class and service class association information for transaction class and synchronization code in the list. In step 86, if EWLM_API3 reported that the synchronization code is old or was not found, then the request is tossed. In step 88, the check discovery list process is repeated until the list is empty.

Figure 6:
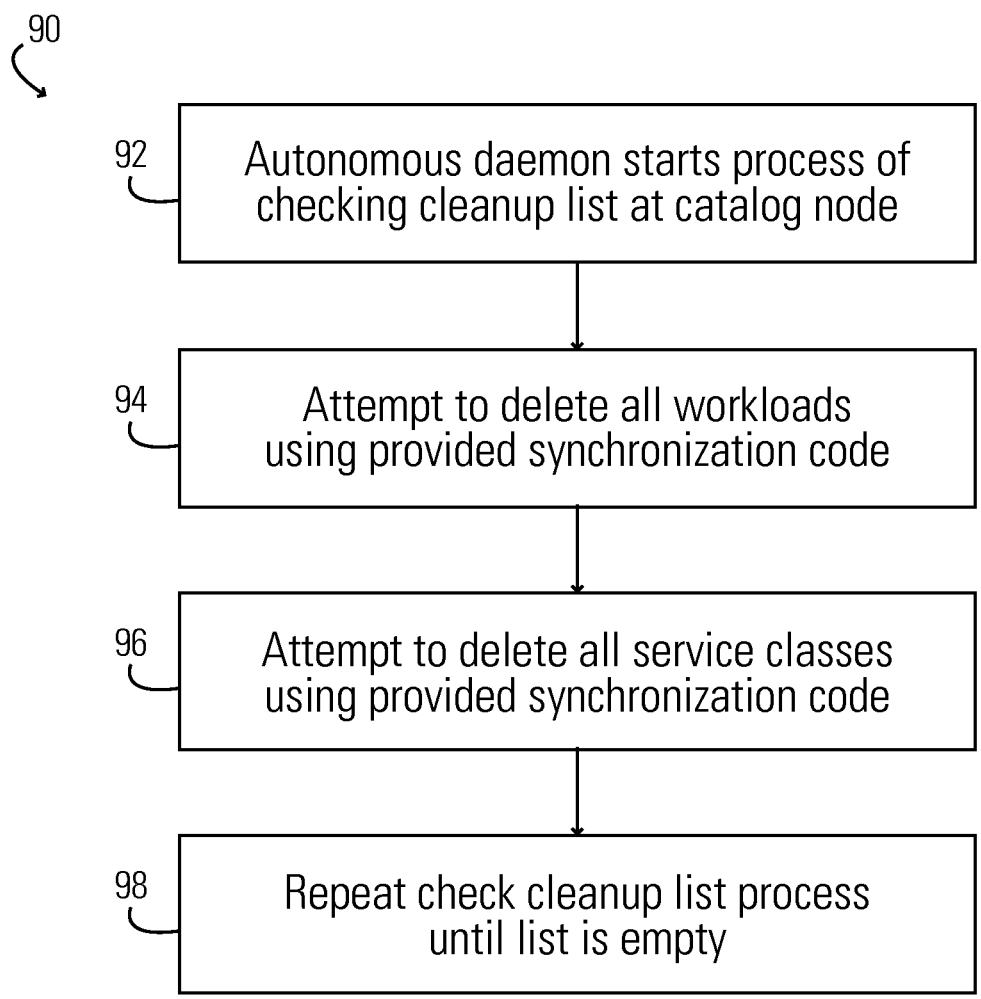
FIG. 6 shows a flow chart of a check cleanup list process used with the method for integrating an external workload manager with a relational database system shown in FIG. 2, in accordance with an embodiment of the invention.

FIG. 6 shows a flow chart of a check cleanup list process 90 used with the method for integrating an external workload manager with a relational database system shown in FIG. 2, in accordance with an embodiment of the invention. In step 92 an autonomous daemon starts the process of checking the cleanup list at the catalog node. In step 94, the process 90 attempts to delete all workloads using provided synchronization code (with commit after each one). In step 96, if all workloads are deleted in step 94, the process 90 attempts to delete all service classes using the provided synchronization code. The process is repeated until the cleanup list is empty, in step 98.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
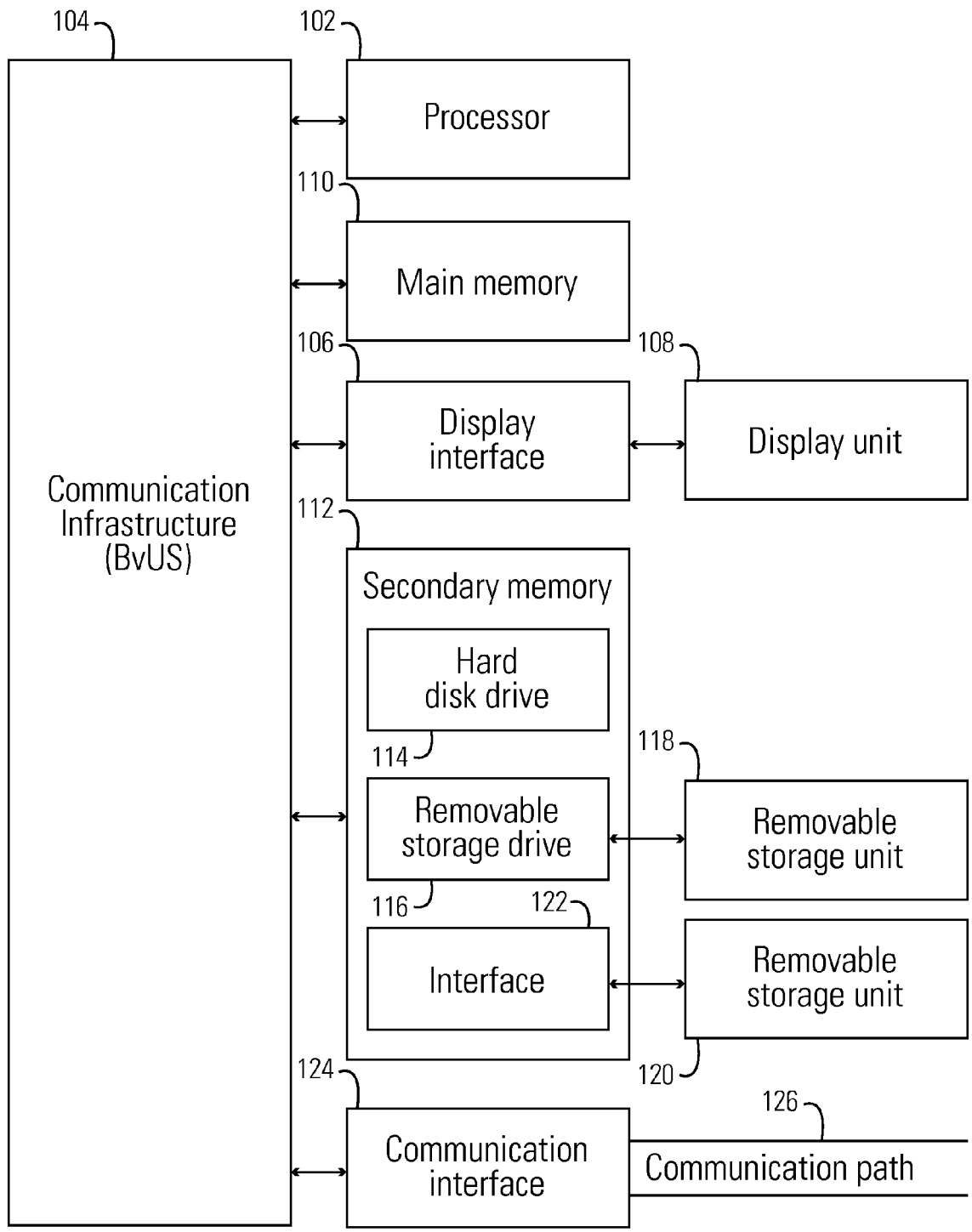
FIG. 7 shows a high level block diagram of an information processing system useful for implementing one embodiment of the present invention.

FIG. 7 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving a request in a database component, said request including a cross component token;
   starting a new unit of work in workload management software in said database component, in response to said request;
   determining, from a cross component workload management unit, a transaction class and a synchronization code using said database component;

finding an internal workload in said workload management software that matches said transaction class and said synchronization code of said cross component workload management unit;

acquiring information for workload management software classifications;

generating internal workload classifications that correspond to the workload management software classifications;

mapping the request to internal workload classifications to process the request;

using said matching internal workload for said new unit of work;

removing, via an autonomous daemon, stale workloads in which related transaction classes are at least one of no longer existing and having been modified and synchronization codes are at least one of having become old and not found; and on a periodic basis, performing checking of a cleanup list at a catalog node, said performing comprising attempting to delete all workloads using a synchronization code, until said cleanup list is empty.

2. The method according to claim 1 further comprising, if said finding does not find an internal workload that matches said transaction class and said synchronization code, performing a cleanup process.

3. The method according to claim 2 wherein said cleanup process comprises, checking a local database partition cleanup list to determine if cleanup is signaled for said synchronization code, and if not, sending said request to a catalog node and adding said request to a local cleanup list.

4. The method according to claim 3 further comprising adding said request to a central cleanup list.

5. The method according to claim 1 further comprising, if said finding does not find an internal workload that matches said transaction class and said synchronization code, performing a discovery process.

6. The method according to claim 5 wherein said discovery process comprises:

checking a local database partition discovery list to determine if there is an existing entry, and if not, sending said request to a catalog node and adding said request to a local discovery list.

7. The method according to claim 6 further comprising adding said request to a central discovery list.

8. The method according to claim 1 further comprising, on a periodic basis, performing checking of a discovery list at a catalog node, said performing comprising:

determining transaction class and service call association information from said cross component workload management unit; and deleting said synchronization code if said synchronization code is old or is not found.

9. The method according to claim 1 wherein said database component is a relational database management system.

10. The method according to claim 1 wherein said cross component workload management unit is an Enterprise Workload Management (EWLM) system.

11. A method comprising:

receiving a request in a relational database management system, said relational database management system having internal workload management software, wherein said request includes an external workload management system token;

starting a new unit of work in said internal workload management software in said relational database management system;

said relational database management system contacting an external workload management system to determine an external workload management system transaction class and synchronization code;

said relational database management system finding an internal workload in said internal workload management software that matches said transaction class and said synchronization code of said external workload management system;

said relational database acquiring information for workload management software classifications;

said relational database generating internal workload classifications that correspond to the workload management software classifications;

said relational database mapping the request to internal workload classifications to process the request;

said relational database management system using said matching internal workload for said new unit of work;

said relational database management system removing, via an autonomous daemon, stale workloads in which related transaction classes are at least one of no longer existing and having been modified and synchronization codes are at least one of having become old and not found; and on a periodic basis, said relational database management system performing checking of a cleanup list at a catalog node, said performing comprising attempting to delete all workloads using a synchronization code, until said cleanup list is empty.

12. The method according to claim 11 further comprising:

discovering when said request represents a new external workload management classification.

13. The method according to claim 11 further comprising automatically acquiring information on new external workload management system classifications; and creating internal workload classifications corresponding to said new external workload management system classification.

14. The method according to claim 11 further comprising mapping said request to an internal workload management classification and to an external workload management system mapping.

15. The A method according to claim 11 wherein said relational database management system shares management of said request with said external workload management system.

16. A system comprising:

a processor;

a relational database management system coupled to the processor;

internal workload management software within said relational database management system and executable in the processor;

an external workload management system;

an autonomous daemon;

said relational database management system contacting an external workload management system to determine an external workload management system transaction class and synchronization code;

said internal workload management software receiving an incoming request which has been classified by said external workload management system, analyzing said request to determine said classification of said request, acquiring information for workload management software classifications, generating internal workload classifications that correspond to the workload management software classifications, and mapping the request to internal workload classifications to process the request;

said autonomous daemon removing stale workloads in which related transaction classes are at least one of no longer existing and having been modified and synchronization codes are at least one of having become old and not found; and on a periodic basis, said relational database management system performing checking of a cleanup list at a catalog node, said performing comprising attempting to delete all workloads using a synchronization code, until said cleanup list is empty.

17. The system according to claim 16 further comprising means for mapping said determined classification of said request to a classification in said internal workload management software.

18. The system according to claim 16 wherein said relational database system comprises DB2 for Linux, Unix and Windows.

19. The system according to claim 16 wherein said external workload management system comprises an Enterprise Workload Management (EWLM) system.

20. A computer program product for integrating an external workload manager and a database system, said computer program product including a non-transitory computer readable medium for causing a computer to implement a method, the method comprising:

receiving a request in a database component, said request including a cross component token;

starting a new unit of work in workload management software in said database component;

determining, from a cross component workload management unit, a transaction class and a synchronization code using said database component;

finding an internal workload in said workload management software that matches said transaction class and said synchronization code of said cross component workload management unit;

acquiring information for workload management software classifications;

generating internal workload classifications that correspond to the workload management software classifications;

mapping the request to internal workload classifications to process the request; using said matching internal workload for said new unit of work;

removing, via an autonomous daemon, stale workloads in which related transaction classes are at least one of no longer existing and having been modified and synchronization codes are at least one of having become old and not found; and on a periodic basis, performing checking of a cleanup list at a catalog node, said performing comprising attempting to delete all workloads using a synchronization code, until said cleanup list is empty.

21. The computer program product according to claim 20, wherein, if said finding does not find an internal workload that matches said transaction class and said synchronization code, said computer usable code is further configured to perform a cleanup process.

22. The computer program product according to claim 20 wherein, if said finding does not find an internal workload that matches said transaction class and said synchronization code, said computer usable code is further configured to perform a discovery process.

23. The computer program product according to claim 20 wherein said computer usable code is further configured to, on a periodic basis, perform checking a discovery list at a catalog node, said performing comprising:

determining transaction class and service call association information from said cross component workload management unit; and deleting said synchronization code if said synchronization code is old or is not found.

* * * * *